United States Patent [19]
Wooten et al.

[11] Patent Number: 5,791,782
[45] Date of Patent: Aug. 11, 1998

[54] CONTACT TEMPERATURE PROBE WITH UNRESTRAINED ORIENTATION

[75] Inventors: David Wooten, Rockville; Bruce Krein, Olney, both of Md.; Jianou Shi, State College, Pa.

[73] Assignee: Fusion Systems Corporation, Rockville, Md.

[21] Appl. No.: 531,602

[22] Filed: Sep. 21, 1995

[51] Int. Cl.$^6$ .............................. G01K 1/00; G01K 7/00
[52] U.S. Cl. .............................. 374/208; 374/163
[58] Field of Search .............................. 374/163, 165, 374/179, 208

[56] References Cited

U.S. PATENT DOCUMENTS

| | | | |
|---|---|---|---|
| 2,736,784 | 2/1956 | Gore | 374/163 |
| 4,081,291 | 3/1978 | English et al. | 374/163 |
| 4,355,911 | 10/1982 | Tymkewicz | 374/208 |
| 4,416,553 | 11/1983 | Huebscher | 374/165 |
| 4,886,371 | 12/1989 | Fondin | 374/208 |
| 5,356,486 | 10/1994 | Sugarman et al. | 374/208 |

*Primary Examiner*—William L. Oen
*Attorney, Agent, or Firm*—Pollock, Vande Sande & Priddy

[57] ABSTRACT

A combination contact temperature probe/wafer support includes a thermocouple enclosing probe head of low thermal mass and large contact area supported by a support means such that 1) there is a high thermal resistivity connection between the support means and the probe head, and 2) the probe head is self orienting under the weight of the wafer so that the contact area is maintained coplanar with the surface of the wafer.

10 Claims, 5 Drawing Sheets

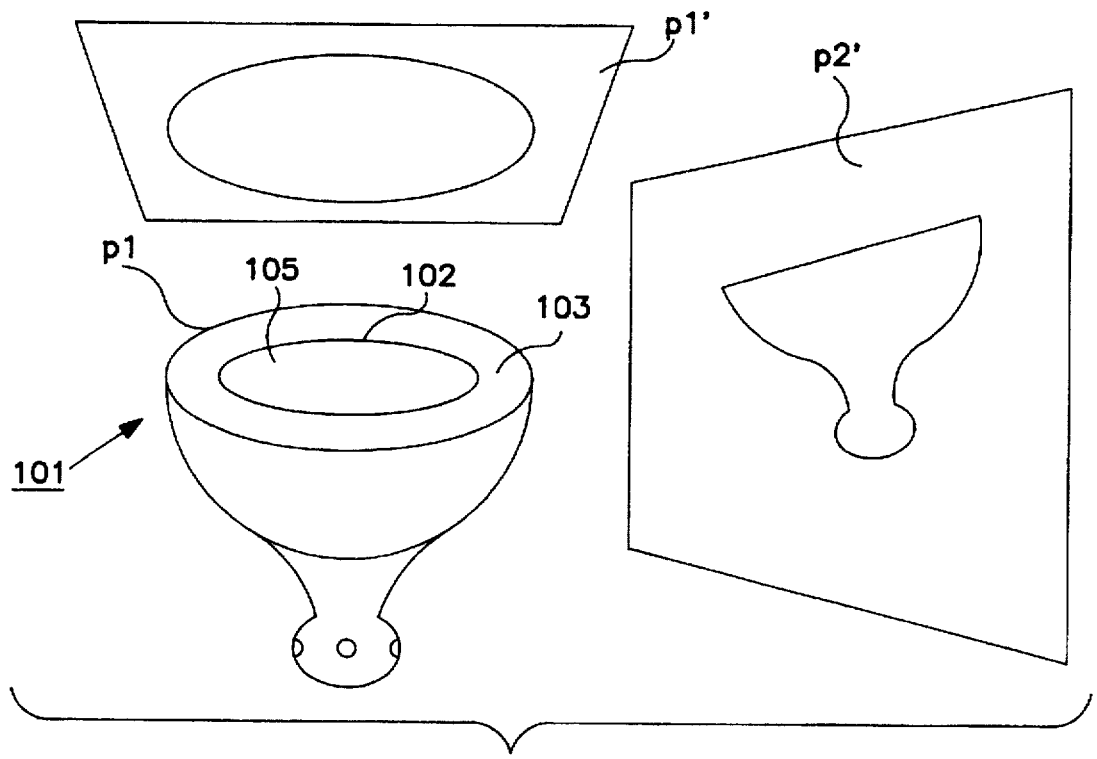
FIG. 3
PRIOR ART
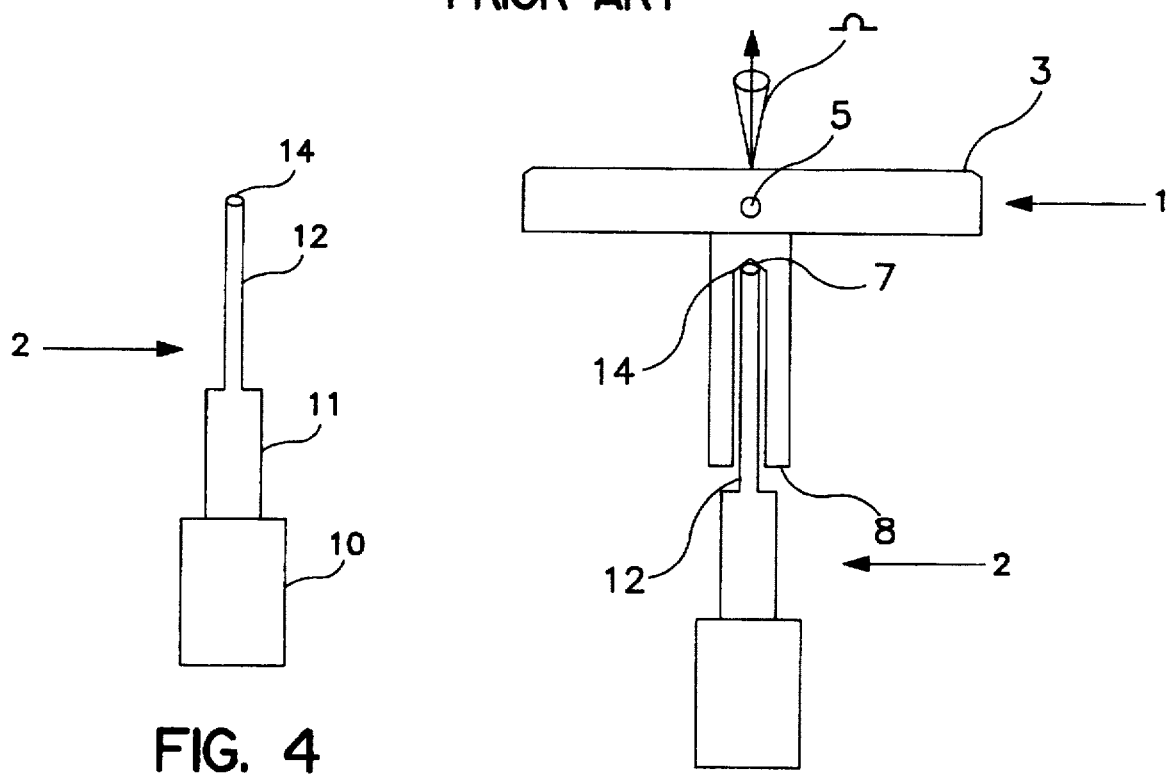
FIG. 4
FIG. 5

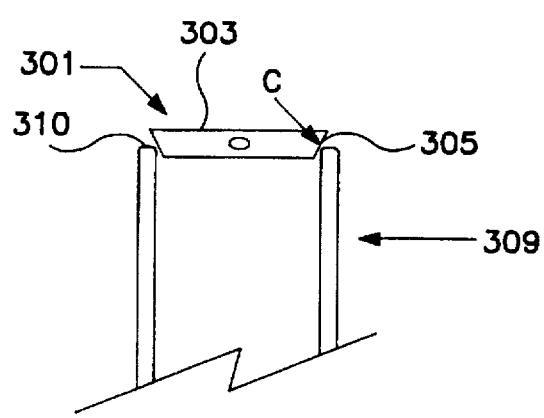
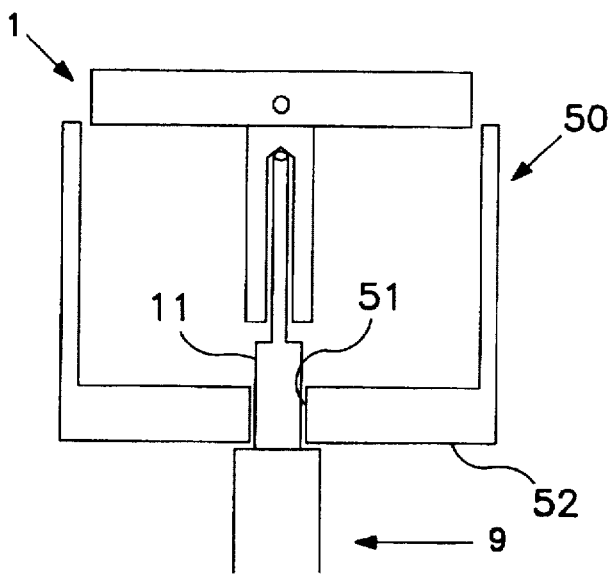
FIG. 9  FIG. 10
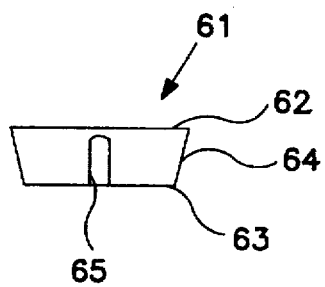
FIG. 11
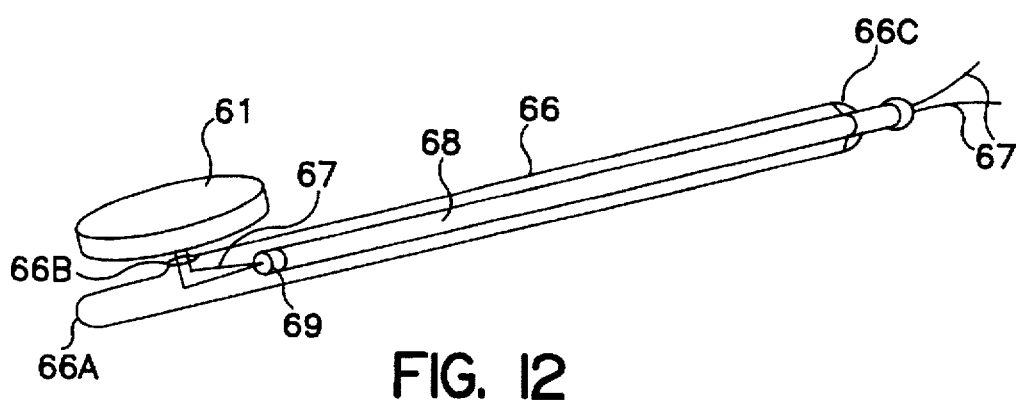
FIG. 12

5,791,782

CONTACT TEMPERATURE PROBE WITH UNRESTRAINED ORIENTATION

BACKGROUND OF THE INVENTION

In the art of semiconductor manufacture there are numerous processes in which a wafer is to be treated at elevated temperature. Examples of such processes are: plasma ashing of photoresist, chemical vapor deposition, and annealing. It is desirable to monitor the temperature of wafers undergoing such manufacturing processes closely.

In semiconductor manufacturing temperature measurement applications, the semiconductor is often heated at an appreciable rate. In such application, it is important that the sensor record the temperature of the wafer as it is heated without a lag.

There are non-contact optical temperature measurement techniques known in the prior art. The optical techniques based on changes in the reflectivity and transmission of semiconductor wafers with temperature suffer from the drawback that the variation of these optical properties from wafer to wafer is detrimental to the accuracy with which the measurements can be made.

Non contact techniques which rely on radiation transfer of heat between an object (e.g. semiconductor wafer) and sensor, such as disclosed in U.S. Pat. No. 5,106,200, are inherently limited as to the rapidity of the response by the relative low power radiated at the temperatures typically used in semiconductor processing. In this connection, it is to be noted that the tests discussed in the '200 patent used very low heating rates (~2.3 C./second) compared with heating rates used in real world semiconductor processing which may be 10 or more times higher.

Contact temperature measurement is a very reliable temperature measurement. Contact temperature measurement is however not without it's own drawbacks. A key drawback to contact temperature measurement is that there is also a problem with the rapidity of response, i.e. a lag between the actual temperature and the temperature read by the contact temperature sensor when the temperature of the object is varying. This problem is recognized in U.S. Pat. No. 5,106,200 wherein it is shown with reference to FIG. 6 of the patent that in a test conducted with a contact temperature sensor there was a temperature difference exceeding 60° C., between the actual temperature and the temperature read by a contact temperature sensor at the end of a 30 second heating process which heated the wafer at the very modest rate of approximately 2.8 C/second.

The lag arises because heat must flow between the probe and the object being measured in order for their temperatures to equalize. Since the probe has a certain thermal mass, a certain finite thermal conductivity, and the thermal contact between the probe and the object also has a certain finite thermal conductivity, the heat flow is not instantaneous and the lag is consequently non-zero. The inventors have recognized that to minimize this lag it is important to 1) minimize the thermal mass of the probe, 2) minimize the thermal resistance of the contact between the probe and the object, and 3) minimize heat escape paths from the probe.

In making the invention, the inventors recognized the importance of bearing pressure at the contact between the temperature probe and the semiconductor wafer. It is not practical to apply force to the wafer to increase the bearing pressure, because the wafer is very fragile. The weight force of the wafer itself is very small and does not provide a great pressure if the weight of the wafer is borne on the contact point.

The inventors faced the problem of making an extremely light weight contact temperature probe with a very flat surface, which securely held a thermocouple in good temperature contact.

In the microlithography industry, plasma processing is used for different purposes, such as plasma enhanced chemical vapor deposition and plasma ashing. In these applications there is a need to measure the temperature. If a thermocouple or other electric temperature measurement means is used to measure temperature, it is necessary to have electric wires leading from the temperature measurement means positioned at the wafer, out of the processing chamber. Unless the chamber is designed so that the wafer locates against a wall of the chamber, the wires will have to run across some part of the chamber. There then arises a problem in plasma processing chambers that the plasma interacts with the wires either electrically or thermally and causes false readings. By the term thermally it is meant that the plasma heats the wires, and the wires in turn conduct heat to the temperature sensitive means. The electrical interaction is more sophisticated and less well understood, however the plasma being electrically active may induce currents and voltages in the wires leading to false signals. The inventors have observed false signals when operating in a plasma environment.

SUMMARY OF THE INVENTION

According to an aspect of the invention, a contact temperature measurement probe for measuring the temperature of a semiconductor wafer, which may also function as one of the supports to support the semiconductor wafer, is provided. The probe may comprise a probe head which is very small and of low heat capacity, has a flat surface to mate with the flat surface of the semiconductor wafer, and is mechanically supported so that it freely rotates under the weight of the wafer such that the flat surface will come to bear against the supported semiconductor wafer squarely.

According to a further aspect of the invention, the probe head comprises a contact surface with a certain dimension (e.g. diameter), to mate with the flat surface of the semiconductor wafer, and is mechanically supported so that it freely rotates under the weight of the wafer such that the flat surface will be arranged against and co-planar with the semiconductor wafer supported, and the probe is further characterized in that the center of rotation is distanced from the contact surface by a distance less than about the dimension of the contact surface.

According to a further aspect of the invention a semiconductor wafer is supported by a plurality of supports including one or more contact temperature measurement probes. The supports are arranged according to the laws of statics such that at least one of the contact temperature probes bears a larger than equal share of the weight of the wafer.

In an embodiment of the invention a semiconductor is supported by one contact temperature probe and two ordinary supports pegs, the three pegs being non-co-linear so that they stably support the wafer. The contact temperature probe is located closer to the center of the wafer compared to the ordinary support pegs.

According to another aspect of this invention a contact temperature measurement probe head, in which is inserted a temperature sensitive means (e.g. a thermocouple), comprises a substantially flat contact surface which is substantially parallel to a certain projection plane and substantially co-extensive with the projected area of the probe head corresponding to the certain projection plane. The certain projection plane is characterized in that the area projected to the certain projection plane has the largest or near to the largest area among all conceivable projection planes of the probe head.

According to another aspect of this invention a contact temperature probe, comprising a probe head comprising a temperature sensitive means, and a contact surface; and a structure supporting the probe head, wherein the coupling between the probe head and its supporting structure, is characterized by high thermal resistivity and free tilting movement of the probe head within a certain range of solid angle.

According to a further aspect of the invention, the coupling between the probe head and the supporting structure consists of a point contact or a line contact. In practice, line and point contacts have some finite area, however this area is very small and as a result the thermal resistivity across the contact is high.

According to a further aspect of the invention the supporting structure comprises a high thermal resistivity section extending from the coupling.

According to another aspect of the invention a method of manufacturing a contact temperature probe head is provided comprising the steps of 1) preliminary steps of forming the rough probe head including drilling a hole in the rough probe head, 2) inserting a thermocouple in the hole, 3) applying a crimping force to the rough probe head in order collapse the hole about the thermocouple and lock the thermocouple in the probe head in good thermal contact within the the hole, and 4) fine machining the rough probe head to form a flat, smooth thermal contact surface.

According to a further aspect of the invention thermal and electrical shielding means are provided surrounding electrical wires leading from a temperature sensing means proximate a wafer in a plasma processing chamber.

It is thus an object of the invention to provide a contact temperature probe which can closely follow the temperature of a semiconductor wafer, the temperature of which is rapidly varying, with only the weight of the wafer providing the contact pressure force between the wafer and the probe.

It is a further object of the invention to provide a combination semiconductor wafer support/contact temperature probe with a self-orienting pivoting probe head, the pivoting action of which requires no more force than the fraction of the weight of the wafer borne by the support.

It is still a further object of the invention to provide a semiconductor wafer support/contact temperature probe which closely follows the changing temperature of a wafer with which it is used.

It is an object of the invention to provide a contact temperature probe capable of making rapid response (small lag) temperature measurements of an object whose temperature is, varying in a vacuum environment, that is without the benefit of gas as a thermal conduit.

It is an object of this invention to provide a contact temperature probe capable of achieving a high ratio of thermal conductivity of the contact to heat capacity.

It is an object of this invention to provide a contact temperature probe which may be used in a plasma processor which is not adversely affected as to the accuracy of its readings by the plasma.

The invention will be better understood by referring to the accompanying drawings, wherein:

BRIEF DESCRIPTION OF THE DRAWINGS

FIG. 3 is perspective drawing of the prior art along with projection planes and projected areas depicted.

FIG. 4 is a front view of a contact temperature probe head support means according to the first embodiment of the invention.

FIG. 5 is partial x-ray view of an assembled contact temperature probe/wafer support according to the first embodiment of the invention.

FIG. 9 shows a third embodiment of the invention.

FIG. 10 shows a contact temperature probe along with a heat shield.

FIG. 11 shows a probe head according to a preferred embodiment of the invention.

FIG. 12 shows a contact temperature probe according to a preferred embodiment of the invention including the probe head shown in FIG. 11.

DETAILED DESCRIPTION OF THE INVENTION

Figure 1:
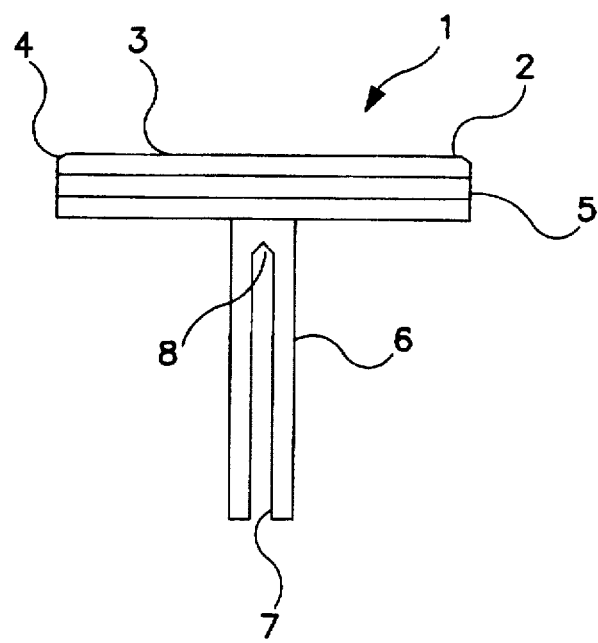
FIG. 1 is a full front section of a contact temperature probe head according to a first embodiment of the invention.

FIG. 1 is a full front section of a contact temperature probe head 1. The probe head comprises upper disc section 2, the top surface 3 of which is the thermal contact surface. The edge of top surface 3 may be broken by a small chamfer 4. A diametral hole 5 is drilled through the disc section 2. The diametral hole accommodates a thermocouple as will be discussed further below. Connected to the center of the bottom of disc section 2, is an axial extending stalk 6. The stalk has a blind axial hole 7, drilled from its free end toward the disk section 2. The end 8 of the blind hole 7, has a conical shape, as would usually be obtained with an ordinary center drill. The end 8, of the blind hole 7 is located slightly below the disc section 2.

In an actual working example constructed, the upper disc section 2 had diameter of 0.162" and a thickness of 0.040". The stalk 6 had a length of 0.300" and a diameter of 0.058". The blind hole 7, had a diameter of 0.045" and a depth of 0.280". The average thickness in the direction perpendicular to the top surface 3, of the probe head, including the stalk section was 0.057". The contact area equals the diameter of the upper disc section.

Figure 2:
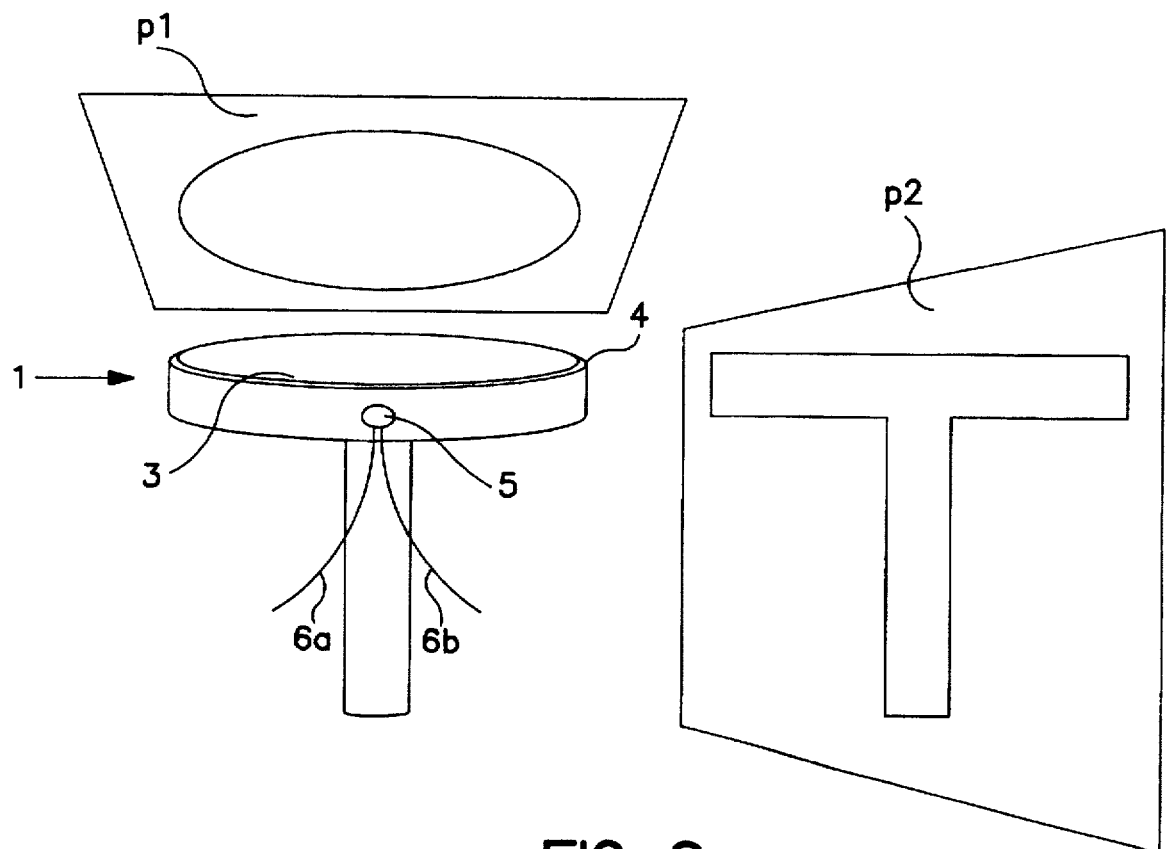
FIG. 2 is a perspective drawing of the probe head shown in FIG. 1, along with projection planes and projected areas depicted.

Referring to FIG. 2, the probe head is shown in perspective. Two projection planes, a horizontal projection plane p1, and vertical projection plane p2 are shown. The area projected on to the horizontal projection plane p1 is the larger area, and it is identical (except for the chamfer) to the area of the chamfer 4 (not shown). This design is advantageous since it results in a large ratio of contact area to heat capacity, which ultimately results in good probe performance i.e.

minimized response lag. In this view the thermocouple wires 6a, 6b can be seen exiting the axial hole 5 of disc section 2 of the probe head 1.

Referring to FIG. 3, the probe head disclosed in U.S. Pat. No. 4,355,911 to Tymkewicz is represented. Vertical p2' and horizontal p1' projection planes are shown as in FIG. 2. The area projected onto horizontal projection plane p1' is a circular area equal in diameter to the outside diameter of the top face 102. The area projected on to the vertical plane p1' is an irregular shaped region about as large as that projected on the horizontal plane p2'. The contact surface 103 is an annular region extending from the outer edge 104 of the top face 102. The contact surface is not coextensive with the area projected onto the horizontal projection plane p1'. Whereas the projected area fills an entire circle, the depression region 105 of the top surface 102 is not part of the contact region 103. This design is not good from the standpoint of the teachings of the present invention. Depression region 105 contributes to the heat capacity of the probe head 101, without contributing to the area of contact. This tends to lower the response of the probe.

FIG. 4 shows a contact temperature probe head support means 9. The support means 9 is comprised of several sections. The lower section 10 would ordinarily be supported on the bottom of a processing chamber as described below. On top of the lower section 10 is a smaller diameter intermediate section 11. On top of intermediate section 11, is a still smaller top section 12. It is desirable that the support section be of high thermal resistance, though it is noted that the connection between the probe head 1 and the support means 9 is already of high thermal resistance so the high thermal resistance of the support simply augments the total thermal resistance of the heat escape path through the support means 9. In the interest of high thermal resistance, the support means should have a low average cross sectional area and/or be made of a material of high thermal resistivity.

The tip 14, of the support means 9 can be either radiused as shown, or conical with a smaller apex angle than the conical end 8 of the bottom of the axial hole 7, in the stalk 6, of the contact probe head 1.

Referring to FIG. 5, the assembled contact temperature probe/wafer support is shown. The top section 12 of support 9, fits with clearance in the axial hole 7 of the probe head 1. The only contact between probe head 1, and support 9 is a circular line contact between the radiused tip 14 or support 9, and the conical end 8 of axial hole 7. The probe head can freely pivot within a certain solid angle range $\Omega$ from vertical. This range is limited by the length of the axial hole 7 and the diameters of the top section 12 and the axial hole 7.

Figure 6:
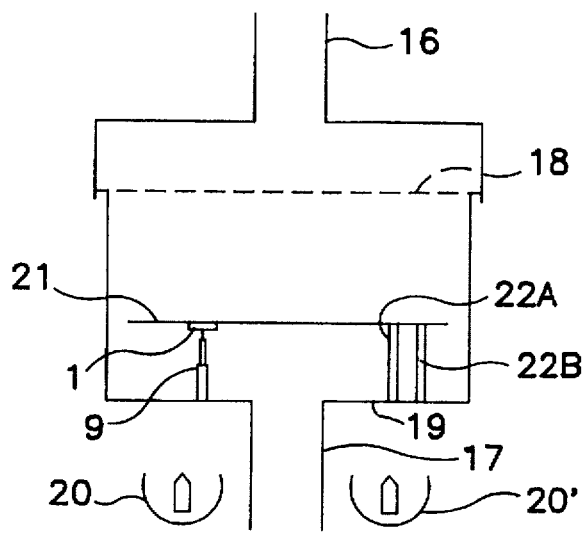
FIG. 6 is a schematic illustration of a semiconductor processing chamber in which the invention is utilized.

Referring to FIG. 6, a schematically illustrated exemplary semiconductor wafer processing chamber 15 is shown. The processing chamber comprises a processing gas inlet 16, a gas distributor plate 18, and a gas exhaust outlet 17. The gas may, for example, be silane for CVD, or oxygen for photoresist stripping. The bottom 19 of the chamber 15 is made of glass. Heating lamps 20, 20', which may be provided in larger numbers, are situated below the bottom of the chamber 15 so as to direct radiant energy through chamber bottom 19 at a semiconductor wafer 21 located in the chamber. The semiconductor wafer 21 is supported above the bottom of the chamber 19 by three supports. Two of the supports, 22A, 22B are glass pegs which extend from the bottom 19. The third support is the contact temperature probe/wafer support shown assembled in FIG. 5. Three supports are able to support the wafer stably. By using only three supports it is possible to increase the weight borne by the contact temperature probe.

The thermocouple wires (not shown) extend out of the diametral hole 5 in the upper disc 2 of the probe head and through a feed-through in the chamber wall to the outside where they can are connected to appropriate temperature measuring circuitry for use with thermocouples.

Figure 7:
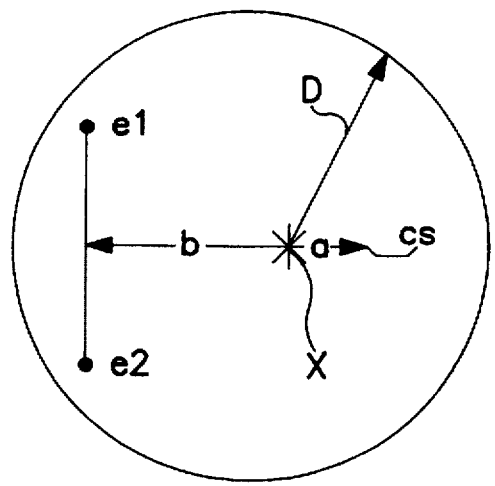
FIG. 7 is schematic view of a wafer showing the placement of wafer support pins and a contact temperature probe/wafer support.

Referring to FIG. 7, a schematic representing the arrangement of wafer supports is depicted. The center of the wafer is marked X. The location of ordinary wafer supports 22A, 22B is denoted by points at e1 and e2. The location of the contact temperature sensor is denoted cs. The diameter of the wafer is marked D. The contact temperature sensor is located closer to the center of the wafer at X than the other supports. Therefore the contact temperature sensor will bear more of the weight of the wafer than the wafer supports 22A, 22B. This leads to an increase in contact pressure between the surface of the wafer and the contact surface 3 of the sensor which results in greater thermal conductivity between the sensor and the wafer. This in turn leads to less temperature lag between the actual temperature of the wafer and the temperature read by the contact temperature sensor.

Figure 8:
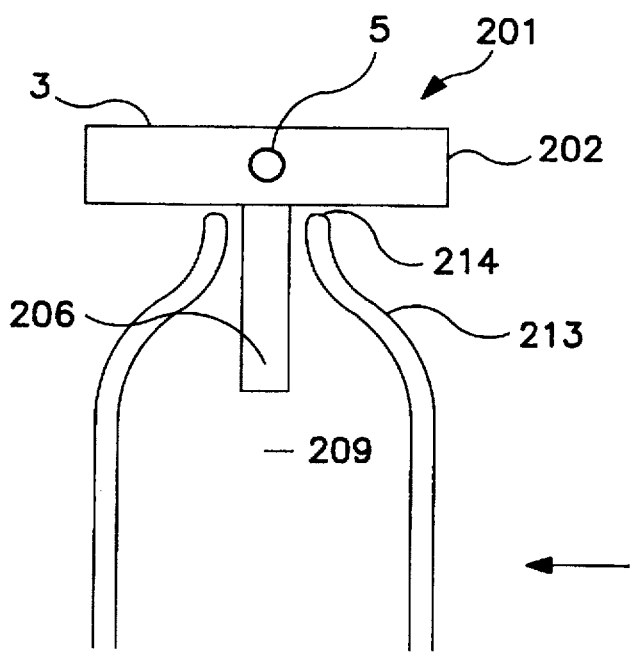
FIG. 8 shows a second embodiment of the invention.

FIG. 8 depicts a second embodiment. In this embodiment, probe head 201 comprises a flat disc section 202 and an axial stalk 206 extending from the center of the bottom of the disc section. The probe head is supported on quartz tube 209 which comprises a tapered portion 213, which reduces to a diameter smaller than the diameter of the flat disc section 202 or the probe head at its end 214. Thus the bottom of the disc section rests on the tube end 214, while the stalk 206 extends into the tube end. It should be noted that the fit between the stalk 206, and the tube at its end 214, is a somewhat slack fit so that the probe head tilts on tube end 214 when the weight of a wafer is bearing on it. Depending on which way the probe head tilts, the center of rotation will move to the point on end 214 towards the direction of tilt. Even if the alignment of the wafer supports is so exact and the surface of the wafer is perfectly straight such that the probe head 201 is not tilted, there will only be a line contact between the probe head 201 and support tube end 214.

FIG. 9 shows still another embodiment. In this embodiment, the probe head 301 is in the form of a relatively flat section of a sphere. Contact face 303 and opposite face 304 are parallel. The outer edge 305 of the probe head 301 is radiused with a center C slightly above the contact face 303. The probe head support is a vertically arranged quartz tube 309. The probe head is supported on the polished end 310 of the tube 309, with the radiused outer edge 305 of the probe head resting on the polished end of the tube. In this arrangement the probe head is free to swivel atop the tube under the weight of the wafer so that the contact surface 303 will align co-planar with the surface of the wafer being supported.

FIG. 10 shows a heat shield 50 installed on the assembled contact temperature probe/wafer support shown in FIG. 5. The heat shield 50 can be advantageous if the probe tends to heat faster than the wafer when subject to heating radiation in an arrangement such as shown in FIG. 6 or some other arrangement. The heat shield 50 is a cup shape with a hole 51 in its bottom 52 the diameter of the intermediate section 11 of the probe head support 9. The heat shield fits on the contact temperature probe (as shown) with the hole positioned around the intermediate section 11, and the bottom 52 atop the bottom section 10 of the probe head support 9.

Referring to FIG. 11 a preferred embodiment of the probe head 61 is shown. The probe head 61 is generally disk shaped. It has a top contact surface 62 and a smaller lower surface 63. The edge wall 64 between the top surface 62 and the bottom surface 63 is necessarily angled. This angling increases the ratio of contact area to heat capacity of the contact temperature probe head. As depicted in hidden lines there is a centered, axial, blind hole 65 extending from the lower surface 63. This hole receives a temperature sensitive means such as a thermocouple. In finished form this hole is collapsed by a crimping operation, as will be described, around the temperature sensitive means.

Referring to FIG. 12, a contact temperature probe is shown. Probe head 61 of FIG. 11 is supported by a quartz member 66. The quartz member 66 is tubular in shape and has a distal end 66A closed. The quartz tube is oriented horizontally. There is an aperture 66B in the wall of the tube with a raised lip 66B formed by working the quartz. The raised lip of the aperture 66B is substantially smaller in diameter than the lower surface 63 of the contact temperature probe. Accordingly, the probe head 61 can freely tilt on this raised lip, under the weight of the wafer. Also, the contact between the underside 63 of the probe head 61 and the raised lip of the aperture 66B is either a line or point contact depending on the orientation of the probe head 61, and therefore has a relatively low thermal conductance. Wires 67 (e.g. thermocouple wires) from the temperature sensitive means extend from aperture 65 in the probe head 61 into quartz member 66 through aperture 66B. The wires in addition to carrying the temperature signal, also serve to hold the probe head in place over aperture 66B. Inside the quartz member 66 is a stainless steel tube 68 which extends from close to the aperture 66B, towards the proximal end of the tube 66C. Within the stainless steel tube 68 is a ceramic insulator 69 of the type generally used for thermocouples. At the proximal end, the stainless steel tube extends out of the quartz member 66. The ceramic insulator 69 extends beyond the proximal end of the stainless steel tube. Low vapor pressure epoxy is used to seal between the quartz member 66, stainless steel tube 68, and the ceramic insulator 69, at the proximal end of the probe. The probe can be fitted to a plasma reactor by using a compression fitting in the side of the reactor lock onto the quartz member 66, as known in the art.

The combination of the insulating quartz member 66 and the air gap between the quartz member and the stainless steel tube serves to insulate the temperature sensitive means wires thermally from the plasma, and prevent the wires from becoming charged electrically by the plasma. The stainless steel tube serves to shield the temperature sensitive means wires from electromagnetic interference produced by the plasma.

Figure 13:
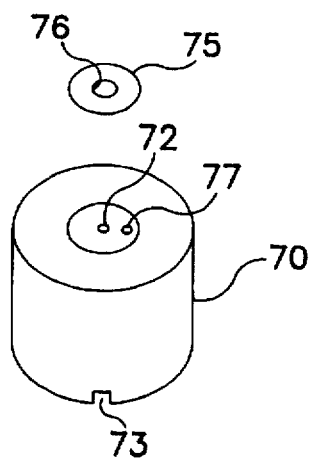
FIG. 13 shows a jig for use in manufacturing the contact temperature probe head according to a preferred embodiment of the invention.

A description will now be given of a method of manufacturing probe heads suitable, in particular, for manufacturing the probe heads shown in FIGS. 11, and 12. FIG. 13 shows a jig which is suitable for manufacturing the probe heads shown in FIGS. 1, 8.

Referring to FIG. 13, a two part jig for holding an unfinished or rough probe head while it is crimped in a press is shown. The rough probe head has roughly the dimensions of the finished probe head and almost the same volume of metal. The rough probe head is cylindrical in shape without tapered walls and is ⅓ taller than the finished probe head. The rough probe head includes axial hole 65. The jig comprises base 70. The base 70 has a recess 71 in its top surface, the depth of which determines the height of the finished probe head. At the bottom of the recess 71 is a centered vertical hole 72 which leads down to a radial groove 73 in the bottom of the base 70.

The second part of the jig is a washer 75. The washer 75 has a height corresponding to the depth of the recess 71 in the base, and an outside diameter corresponding to the inside diameter of the recess. The hole 76 in the washer 75 is tapered, and corresponds to the dimensions of the finished probe head.

Figure 14:
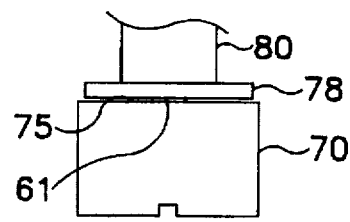
FIG. 14 shows the set up for using the jig shown in FIG. 10.

Referring to FIG. 14, the setup for crimping the probe head will now be described. The washer 75 is set in the base 70. The unfinished probe head is set into the hole 76 in the washer 75 with bottom surface 63 facing down, and with the temperature sensitive means positioned in hole 65 and the wires extending through the hole 72 and groove 73 in the base.

The jig with the unfinished probe head and thermocouple is now set under the ram of a press 80. A gauge block 78 is placed between the jig and the ram 80 resting on the probe head 61.

The crimping operation is performed by operating the press to press the gauge block against the probe head, collapsing the disc to a thickness equal the recess height and collapsing the axial bore 65 onto the thermocouple. This creates a strong mechanical and good thermal connection between the probe head and the thermocouple, without distorting its delicate structure.

After the crimping operation, the contact face 62 of the probe head is finished to a smooth finish. This may be accomplished by sanding with 600 grit sandpaper.

EXAMPLE

Figure 15:
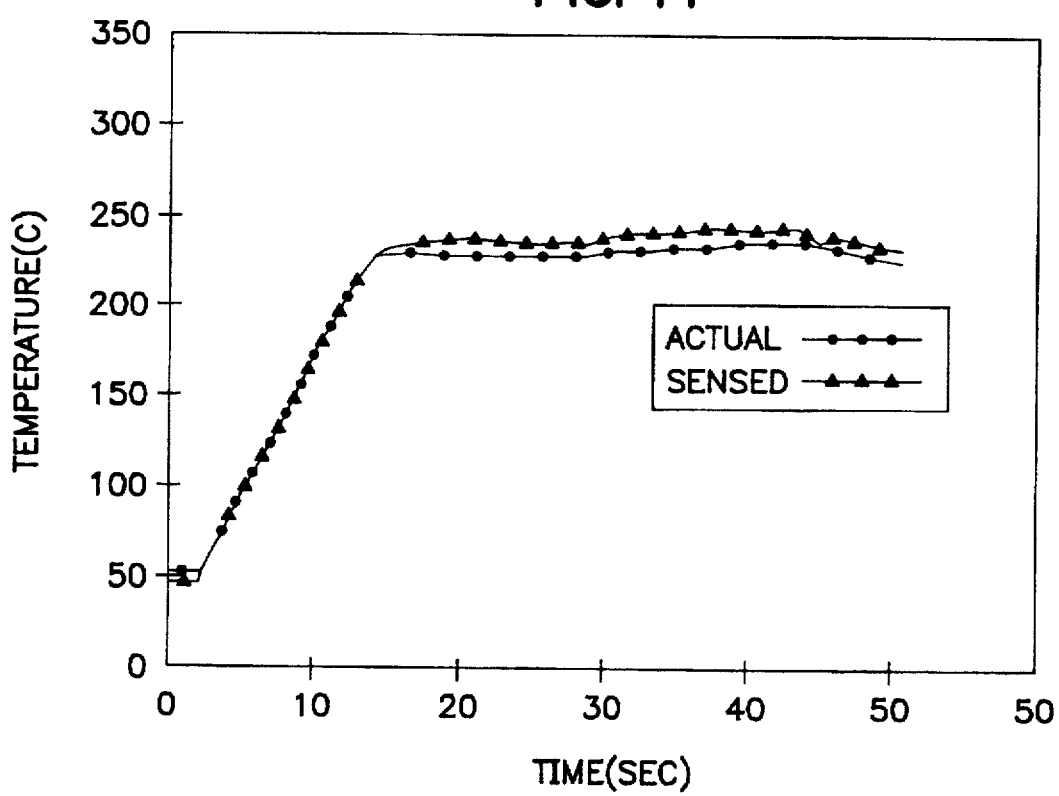
FIG. 15 is a graph showing two sets of data of temperature measurements during a high rate temperature ramp.

A Sensarray™ wafer manufactured by Sensarray Corporation of Santa Clara, Calif. was used to test the performance of the contact temperature sensor. The Sensarray wafer has thermocouples embedded in its surface. The average of the readings from the thermocouples of the Sensarray wafer was taken as the actual temperature of the wafer. The sensarray wafer was put into a plasma ashing processing chamber such as depicted in FIG. 6. In this test the contact temperature sensor and quartz wafer support pins were arranged symmetrically so as to equally distribute the weight of the wafer around all three. Heating lamps as shown in FIG. 6 were used to heat the wafer. As shown in FIG. 15 the temperature of the wafer was heated from 50° C. at t=2 sec. to 225° C. at t=15 sec., at a constant rate of about 13.5° C./second. As can be seen in the graph, the temperature sensed by the contact temperature probe denoted by the triangle marked line, followed the temperature read from the Sensarray™ thermocouples during this ramp. After the temperature stabilized, a slight divergence of less than 10 degrees occurred.

These results are far better than those reported in the above-mentioned U.S. Pat. No. 5,106,200 discussed in the Background section, in terms of how closely the temperature is tracked by the probe for a given ramp rate. The ramp rate (Degrees/Second) is higher and the deviance of the probe temperature from the actual temperature is smaller.

It should be noted that while the invention has been disclosed in connection with illustrative and preferred embodiments, variations will occur to those skilled in the art, and the invention is defined in the claims appended hereto.

We claim:

1. A contact temperature probe for measuring the temperature of a semiconductor wafer, comprising,
   a contact temperature probe head comprising a flat contact section, a flat contact surface on said flat contact section on which the weight of said semiconductor wafer bears during use of said probe, and a temperature detection means disposed in said flat contact section, and support means arranged to be stationary during use of said probe, for supporting said probe head without constraining its orientation within a certain solid angle, such that said probe head may freely pivot within said solid angle under the weight of said semiconductor wafer.

2. A contact temperature probe according to claim 1, further characterized in that sa-id probe head is supported such that said probe pivots about a center which is closer to said contact surface than a characteristic dimension of said contact surface.

3. A contact temperature means according to claim 1, further characterized in that said support means for supporting said probe has a high thermal resistance relative to a thermal resistance of a contact between said contact surface and an object to measured.

4. A temperature probe according to claim 1 wherein said probe head includes a flat bottom and said support means comprises a quartz tube with an aperture having a raised lip, and said probe head is supported on said aperture.

5. A temperature probe according to claim 1 further comprising a hollow stalk extending from said probe head, wherein said support means comprises a rod which extends into said hollow stalk to support said probe head.

6. A temperature probe according to claim 5 wherein said rod has a diameter somewhat smaller than the interior of said hollow stalk to enable said probe head to be unrestrained in orientation within a certain solid angular range.

7. A temperature probe according to claim 1 wherein said probe head has a radiused edge, said support means is a hollow tube having an interior opening with a diameter substantially equal to a diameter of said probe head, and wherein said radiused edge rests on said opening, causing said probe head to be unrestrained in orientation within a certain solid angular range.

8. A temperature probe according to claim 1 wherein probe head contacts said support means at a point or line.

9. A temperature probe according to claim 1 wherein said flat contact surface is substantially coextensive with a projected area of said probe head, and said projected area is substantially equal to a largest projected area of said probe head.

10. A contact temperature means according to claim 4, further characterized in that a thermal resistance value of a contact between said support means for supporting said probe head and said probe head is greater than a thermal resistance of a contact between said contact surface and an object to be measured.

* * * * *